United States Patent
Juntumaa et al.

(10) Patent No.: US 6,430,189 B1
(45) Date of Patent: Aug. 6, 2002

(54) INTERNAL TRAFFIC IN A TELECOMMUNICATIONS NODE

(75) Inventors: Jyrki Juntumaa; Timo Ylonen, both of Espoo; Timo Paajanen; Jan Hellstrom, both of Helsinki, all of (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/671,752

(22) Filed: Sep. 27, 2000

Related U.S. Application Data

(63) Continuation of application No. PCT/FI99/00452, filed on May 27, 1999.

(30) Foreign Application Priority Data

May 28, 1998 (FI) .................................................. 981188

(51) Int. Cl.[7] .............................................. H04L 12/56
(52) U.S. Cl. ..................................... 370/399; 370/409
(58) Field of Search .................................. 370/395, 396, 370/397, 398, 399, 409, 410, 522, 395.61, 395.63, 395.64, 395.65, 395.2, 426, 231, 252, 433, 420, 6, 7

(56) References Cited

U.S. PATENT DOCUMENTS

| | | | |
|---|---|---|---|
| 5,303,236 A | | 4/1994 | Kunimoto et al. |
| 5,315,588 A | | 5/1994 | Kajiwara et al. |
| 5,651,005 A | * | 7/1997 | Kwok et al. ................ 370/399 |
| 5,809,021 A | | 9/1998 | Diaz et al. |
| 5,898,688 A | | 4/1999 | Norton et al. |
| 6,141,322 A | * | 10/2000 | Poretsky ..................... 370/398 |

FOREIGN PATENT DOCUMENTS

| | | |
|---|---|---|
| EP | 0878938 | 11/1998 |
| JP | 09116554 | 5/1997 |
| WO | WO 97/42737 | 11/1997 |

* cited by examiner

*Primary Examiner*—Huy D. Vu
*Assistant Examiner*—Phuongchau Ba Nguyen
(74) *Attorney, Agent, or Firm*—Altera Law Group, LLC

(57) ABSTRACT

In computers (Processor Unit 1, . . . , Processor Unit N) that handle the operation of an ATM switch, applications may communicate with each other by transmitting internal traffic cells to each other, which are transported among other subscriber traffic. By assigning service categories to the applications, which correspond as well as possible to their quality needs, it is possible to optimize the quality of the connection services of internal connections. By setting the traffic parameters of internal traffic individually changeable, internal traffic and subscriber traffic can be integrated in the best possible way. In the preferred embodiment, the service category can be selected connection-specifically. In such a case, each application selects the best possible service category. In the second embodiment, the connection-specific category is selected to be the same for all the applications. In such a case, all the applications use the same predetermined service category. It is possible to divide the application into groups and to select the same service category for all the applications. In such a case, the application within the group always use the same predetermined service category.

13 Claims, 5 Drawing Sheets

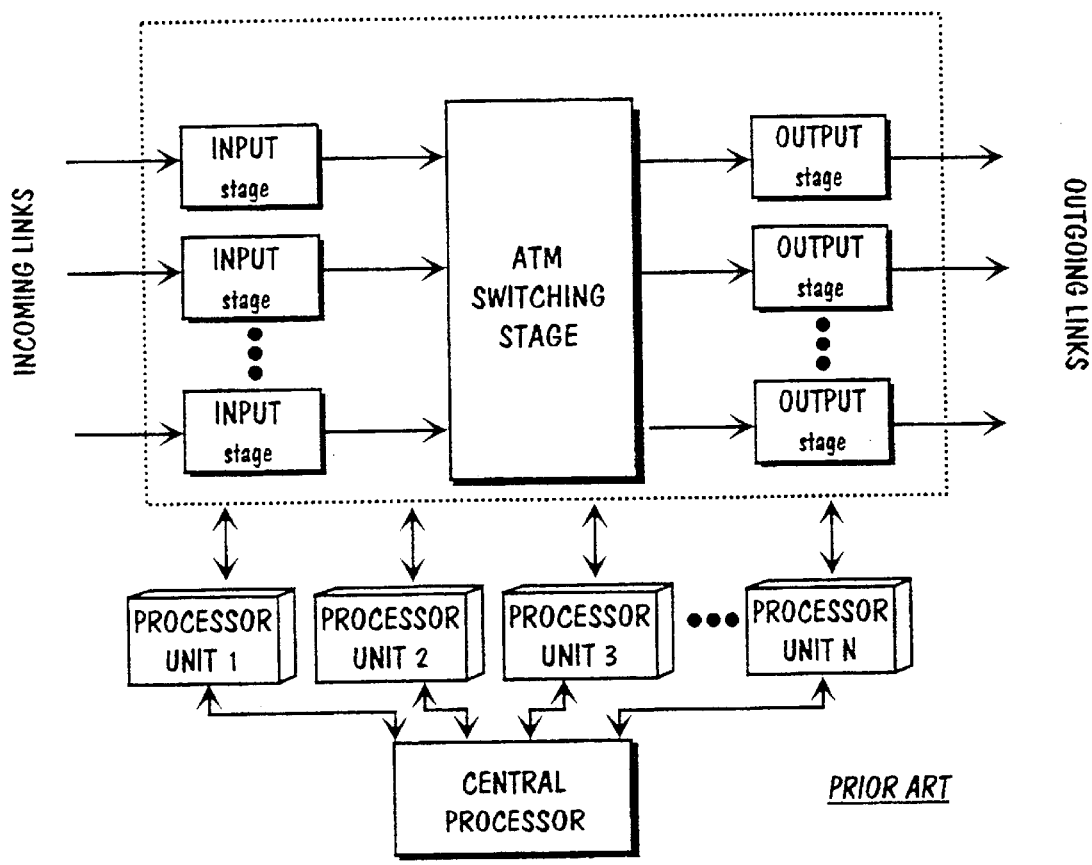
FIG. 2 *PRIOR ART*
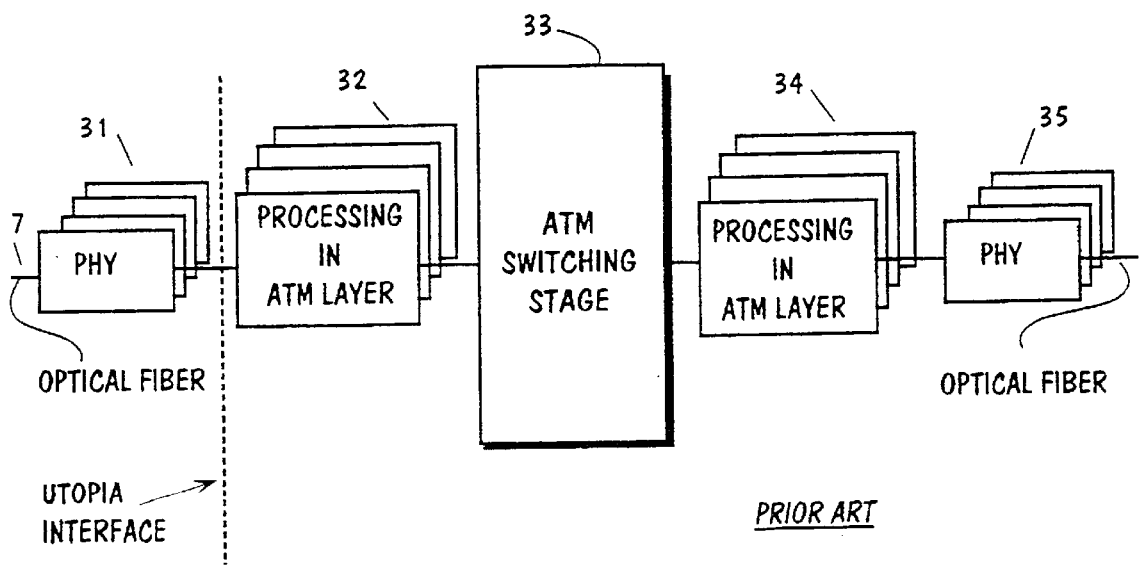
FIG. 3 *PRIOR ART*

INTERNAL TRAFFIC IN A TELECOMMUNICATIONS NODE

This application is a continuation of international application Serial No. PCT/FI99/00452, filed May 27, 1999.

FIELD OF THE INVENTION

The present invention relates to arranging traffic within telecommunication equipment and internal traffic between a plurality of telecommunication equipment. In particular, the invention relates to internal traffic in a node of a broadband telecommunication network, such as an ATM node.

BACKGROUND OF THE INVENTION

The architecture of a modern digital exchange is illustrated in FIG. 1. The basic function of the exchange is to connect the exchange input port to the correct output port, in other words, to connect an incoming call on a specific incoming circuit to an outgoing call on a specific outgoing circuit. In practice, the information in a specific input side PCM timeslot is connected to a specific PCM timeslot at the output side. The incoming circuits, whether backbone lines or subscriber lines, are connected to the exchange by line interfaces. A switching matrix interconnects incoming and outgoing speech channel timeslots, and also the signalling channels and internal data channels of the exchange are connected through it.

The core of the system is the exchange control whose functions have been distributed over a plurality of units, denoted in the figure with general reference marks Unit 1, ..., Unit N, each carrying out its own task. As examples of such units are mentioned a unit controlling the switching matrix, signalling units carrying out different types of signalling and supervision at the input and output sides, a unit collecting call-specific charging data, a unit gathering statistics, etc. Each unit comprises at least one central processing unit CPU, a bus adapter and memory. Thus, each unit actually constitutes a computer.

The units must be able to negotiate with each other, so this exchange-internal traffic has to be arranged in some way. The most common way is to set up a dedicated common message bus, as done in, FIG. 1, into which the units are connected via the bus adapter. Also, the data transmitted by the exchange units to units of another exchange can be considered to be internal traffic. A typical example of this are the various types of messages exchanged in connection with the call set-up phase. Therefore, depending on the case, the common resources shared by internal traffic are the message bus, switching stage and the trunk circuits between nodes.

The exchange additionally comprises an Operation and Maintenance Unit (OAM), taking care of the maintenance of the system.

This prior art architecture is based on the use of a common message bus which carries traffic between the units. The main part of that traffic thus passes isolated from the other traffic passing through the exchange. The exchange switching matrix connects the signalling messages sent by the nodes to other nodes, to the appropriate circuit and correspondingly the switching stage forwards the messages received from the circuits for this node to the correct units.

Apart from the type described above, the telecommunication network nodes may also be ATM nodes (Asynchronous Transfer Mode), as is nowadays the case more and more often. ATM is a connection-oriented, packet switched, general purpose and scalable data transmission method in which information is sent in fixed-length cells. The cell consists of a five-byte-long header and a 48-byte-long information section. The header fields include a Virtual Path Indicator (VPI) and a Virtual Channel Indicator (VCI). At the ATM switch, the cells are transferred from a logical input channel to one or more logical output channels. The logical channel consists of the number of the physical link (e.g. optical cable) and the channel identifier on this link, in other words the VPI/VCI information. One physical transfer medium, such as an optical cable, may comprise a plurality of virtual paths VP and each virtual path comprises a plurality of virtual channels VC.

Because the cells are of a fixed length, the connections at ATM switches can be performed at equipment level on the basis of the cell header, and therefore at very high speed. Cells belonging to different connections are distinguished from each other on the basis of the virtual path (VPI) and the virtual channel (VCI) identifier. As the connection is set up, a fixed route is determined through the network, i.e. a virtual link along which the cells of the connection are routed. Based on the VPINCI values, the cells are switched at the network nodes. The VPINCI values are transmission link specific and consequently usually change in connection with switching at VP or VC level. At the end of the data transfer, the connection is released.

FIG. 2 illustrates a simplified ATM switch. It consists of input stages and output stages, into which the physical input and output fibres are connected, and of a switching stage. The input and output stages constitute the external network interfaces. The interface type may be either UNI (User Network Interface) or NNI (Network Network Interface). The input stage reads the address information, i.e. VPI and VCI identifiers, of the cell received from the input link and converts them into new VPINCI values which the output stage inserts into the header of the cell sent to the output link. The conversion is carried out with the aid of a conversion table, and at the same time the switching stage is informed of which output link the switching stage is to direct the cell in question.

The software of the switch is distributed over functional blocks, processor units 1, ... n, handled by computers. The most complex tasks may be left for the central processor to handle. The computers are nearly always of the embedded type, meaning that display units and other peripheral devices are not required.

As the figure indicates, the architecture of the ATM switch greatly resembles that of an STM switch; after all, the basic task of them both is the same, e.g. to connect information from an input link to an output link.

FIG. 3 is a more detailed illustration of an ATM switch. A cell, either of UNI or NNI type, from optical fibre 7 is received at circuit 31 of the PHY layer that terminates the line. The PHY (Physical Layer) carries out transmission system specific tasks at the bit level and is responsible for cell adaptation to each of the transmission systems, as well as for cell masking, cell header error checks, and cell rate justification.

From circuit 31 of the PHY layer, the cell passes to circuit 32 of the ATM layer over the interface. The ATM layer only deals with the cell header, its task being cell switching, multiplexing and demultiplexing, cell header generation and removal, as well as flow control at the User Network Interface (UNI). Additional tasks for the ATM layer include header error detection and correction, as well as block synchronization. Above the ATM layer, the AAL (ATM Adaptation Layer) fragments the higher layer frames and reassembles them at the other end, in other words, carries out the SAR (Segmentation and Reassembly) function.

The above interface has been standardized by the ATM Forum as UTOPIA, and it has become the de facto industrial standard followed by all the manufacturers of integrated ATM circuits. Over the interface, nothing but ATM cell data is transmitted, which includes control signals required by the two-way transfer, i.e. the so-called handshaking signals.

Circuit 32 of the ATM layer sends the cell to the input buffer of ATM switching stage 33. From there, the stage connects it to the other side of the stage, to output port 35. At the output port, the VPI/VCI value in the cell address field is examined, and the cell is transmitted to the correct virtual channel.

The processor units in FIG. 2 and the processor units in other nodes must be able to negotiate with each other. One way to arrange node-internal traffic is to connect the processor units to a common bus, which is done in the case of the switch in FIG. 1.

Another way is to send the internal-traffic cells among other traffic, as illustrated in FIG. 4. Here, the applications of processor units Unit 1, . . . , unit N may directly connect to each other via the AAL/ATM and PHY layers. One of the units (Central Processor) is the control computer controlling the switching stage. Because the processor units are connected to the ATM network as any other traffic source, the applications running in the unit can transmit information to the applications in the other units and receive information from each other. It should be noted that data transfer between applications within the processor unit naturally takes place using the computer's internal bus. The AAL layer fragments the data produced by the application and intended for an application running in another processor unit to the length of the ATM cell's data section. The ATM layer packets the data into the ATM cells and adds the VPI/VCI information to them. The physical layer sends the packets forward.

At the virtual connection set-up phase, the source and the network negotiate what kind of behaviour is expected of the ATM layer, i.e. they make a traffic agreement. The source informs the network of its traffic parameters and the Service Category it wants. The characteristics of the source, such as a computer, are described with traffic parameters. Firstly, they are utilized in the Connection Admission Control (CAC) process where the network decides whether the requested connection can be granted, and secondly in association with connection and network parameter supervision where the network element monitors that the source stays within the traffic parameters it has announced.

It has nowadays been agreed that the traffic source requesting a connection at least indicates the following as its traffic parameters: PCR (Peak Cell Rate), SCR (Sustainable Cell Rate), MBS (Maximum Burst Size), MCR (Minimum Cell Rate), and QoS (Quality of Service). Quality parameters include CVD (Cell Delay Variation), MaxCTD (Maximum Cell Transfer Delay) and CLR (Cell Loss Ratio).

The source additionally states the ATM adaptation layer (AAL) service it wants. AAL protocols comprise AAL1, AAL2, AAL3/4 and AAL5. Attached Table 1 shows the ATM layer service categories according to the ATM Forum, and the related traffic parameters.

TABLE 1

| Service category | Traffic parameters | Parameters related to service quality (guaranteed) | | | Feedback control |
|---|---|---|---|---|---|
| | | CLR | Delay/ variation | bandwidth | |
| CBR | PCR | X | X | X | NO |
| Rt-VBR | PCR, SCR, MBS | X | X | X | NO |
| Nrt-VBR | PCR, SCR, MBS | X | NO | X | NO |
| ABR | PCR, MCR + behavior parameters | X | NO | X | X |
| UBR | PCR | NO | NO | NO | NO |

Note.
X denotes that the parameter is defined or the feature is in use.

CBR (Constant Bit Rate) is intended for real-time traffic sources that transmit at a fixed rate. Attributes relating to delay and variation thereof are guaranteed for the connection.

VBR (Variable Bit Rate) is intended for variable rate traffic sources. The category has been divided into two subcategories: rt-VBR, in which rt stands for real time, and nrt-VBR in which nrt stands for non real time. The sources are bursty, which means that the source must announce the Maximum Burst Size MBR.

ABR (Available Bit Rate) is intended for bursty sources that do not have tight constraints on delay variation, which means that no guarantees are given as to transmission delays. The source must announce the Minimum Cell Rate (MCR).

UBR (Unspecified Bit Rate) is intended for delay-tolerant, low-priority traffic.

The use of the network resources is controlled by Traffic Management and Performance Management. Traffic management is based on monitoring the traffic parameters agreed upon at the connection set-up stage, so that a specific Quality of Service guaranteed for the traffic source is maintained.

When cells of switch-internal traffic are transmitted among other traffic, the common resources create the problem that internal traffic can cause interference to other traffic. Interference is caused to subscriber traffic, if internal traffic decreases the quality of service intended for subscriber traffic by, for example, increasing the Cell Loss Ratio of subscriber traffic ATM cells.

The object of this invention is an arrangement according to which the interference caused by internal traffic to other traffic can be minimized while, however, maintaining internal traffic as efficient as possible. The aim is to integrate internal traffic with subscriber traffic and to offer the best possible connection quality for different applications when internal traffic and subscriber traffic use common resources.

This aim is achieved with specifications described in the dependent claims.

BRIEF SUMMARY OF THE INVENTION

The invention is based on the observation that the quality of an internal connection depends on which service category it belongs to. That being the case, it is possible to optimize the quality of the connection services of internal connections by assigning service categories to the applications, which correspond as well as possible to their quality needs. Secondly, by setting the traffic parameters of internal traffic individually changeable, internal traffic and subscriber traffic can be integrated in the best possible way.

In the preferred embodiment, the service category can be selected connection-specifically. In such a case, each application selects the best possible service category.

In the second embodiment, the connection-specific service category is selected to be the same for all the applications. In such a case, all the applications use the same predetermined service category.

In a variation of the second embodiment, the applications are divided into groups, and the same service category is selcted for all the applications within the group. Consequently, the same applications within a group always use the same predetermined service category.

BRIEF DESCRIPTION OF THE DRAWINGS

The invention is described in closer detail with reference to the attached schematic drawings, in which FIG. 2 illustrates an ATM switch, FIG. 3 illustrates network connections of the ATM switch.

DETAILED DESCRIPTION OF THE INVENTION

Figure 1:
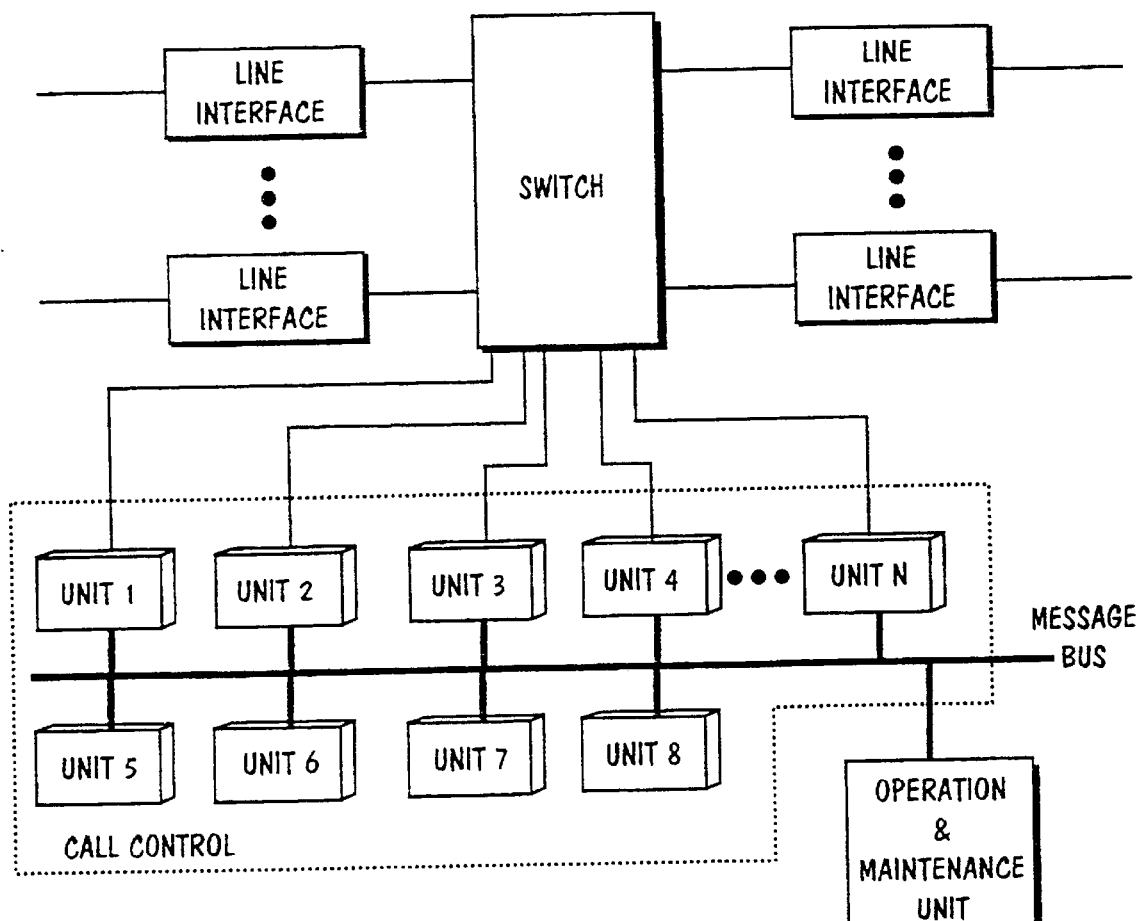
FIG. 1 illustrates a TDM switch.
Figure 4:
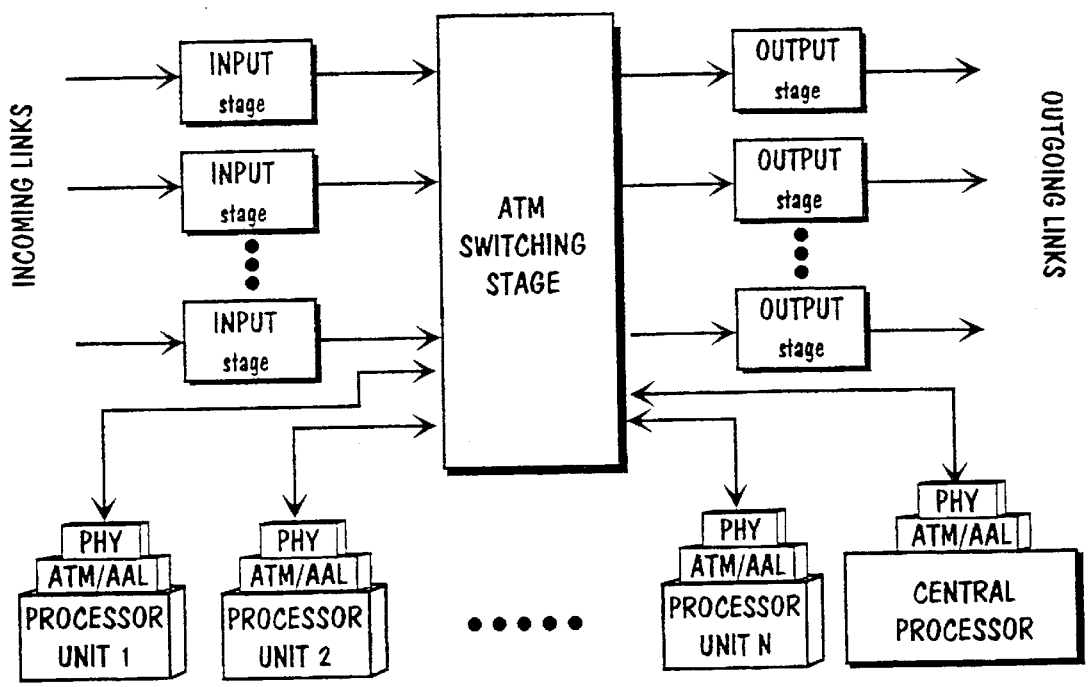
FIG. 4 illustrates arranging internal traffic of the ATM switch.

The invention will be described in greater detail referring to FIG. 4. The ATM switch in the figure has N computers (Processor unit 1, ..., Processor Unit N) and additionally one control computer (Central Processor) controlling the switching stage.

Computer units Unit 1, ..., Unit N comprise applications that wish to communicate with applications in other units. This takes place by opening an ATM connection for the communication through the switching stage. Each of the computer units has a local entity of its own, which can be termed a "post office" or a "telecommunication server." The entity may be embedded into an AAL entity. The telecommunication server offers a telecommunication service for the applications of the unit, through which communication takes place to the applications of other computer units. The application thus requests the entity "telecommunication server" to set up the connection, and this entity then communicates with the AAL layer. The connection set-up requests made by the AAL layer are addressed to the control computer. In reality, there need not exist a separate control computer but any computer comprising a resource manager handling connection acceptance and control is a control computer. It is assumed here that said resource manager is in the Central Processor computer of FIG. 4.

The connection opening can be initiated as with any ATM traffic source. Whenever the requesting application wishes to communicate with an another application, it sends an ATM connection opening request to the control computer. In such a case, the application requesting the connection, for example an application running in Processor Unit 1, sets as the receiving party the identifier of the application or the identifiers of the applications for which the information in intended. The transmitting application does not necessarily have to know in which computer the receiving application is running.

An application requesting service according to the specification defined by the ATM Forum states the traffic and quality parameters as well as the service category it desires in its request. On the basis of these, a Connection Admission Control (CAC) process checks whether a connection can be granted with the values requested without decreasing the quality of the existing connections. The connection admission control procedure is of prior art in the field.

The drawback of this connection set-up method is that the application requesting the connection cannot be sure whether the control computer opens the connection asked for by the requesting application. Granting connections in a random manner cannot be accepted in the case of applications of such important switches.

Randomness can be removed by establishing the telecommunication connections only once from each computer unit Unit 1, ..., Unit N to each other and by maintaining the established connections permanently. So, they are not established and released with each individual service request, although that would, of course, be possible. In such a case, the communication protocol is negotiated, but the connection itself already exists.

The switch-internal connections employed by the computers use the same resources as subscriber traffic. The control computer must check whether there are enough resources in the switch and whether the connection can be set up. A prerequisite is that subscriber traffic and switch-internal traffic do not interfere with one another. This is ensured by the inventive method, with the use of Traffic Management and Policing, known per se.

The preferred embodiment of the invention

According to the preferred embodiment of the invention, internal traffic and subscriber traffic can be integrated with one another in the best possible way when, firstly, the traffic parameters of internal traffic can be changed as need be, and, secondly, when the service categories of internal traffic can be selected connection-specifically. The individually changeable traffic parameters of internal traffic integrate internal traffic with subscriber traffic in the best possible way. The individually changeable service category of internal traffic gives it the best possible quality. It is not necessary that the selection is done among all the existing service categories, but a suitable portion of them may suffice. The traffic parameters and the service quality are determined in a program in the computer unit.

Figure 5:
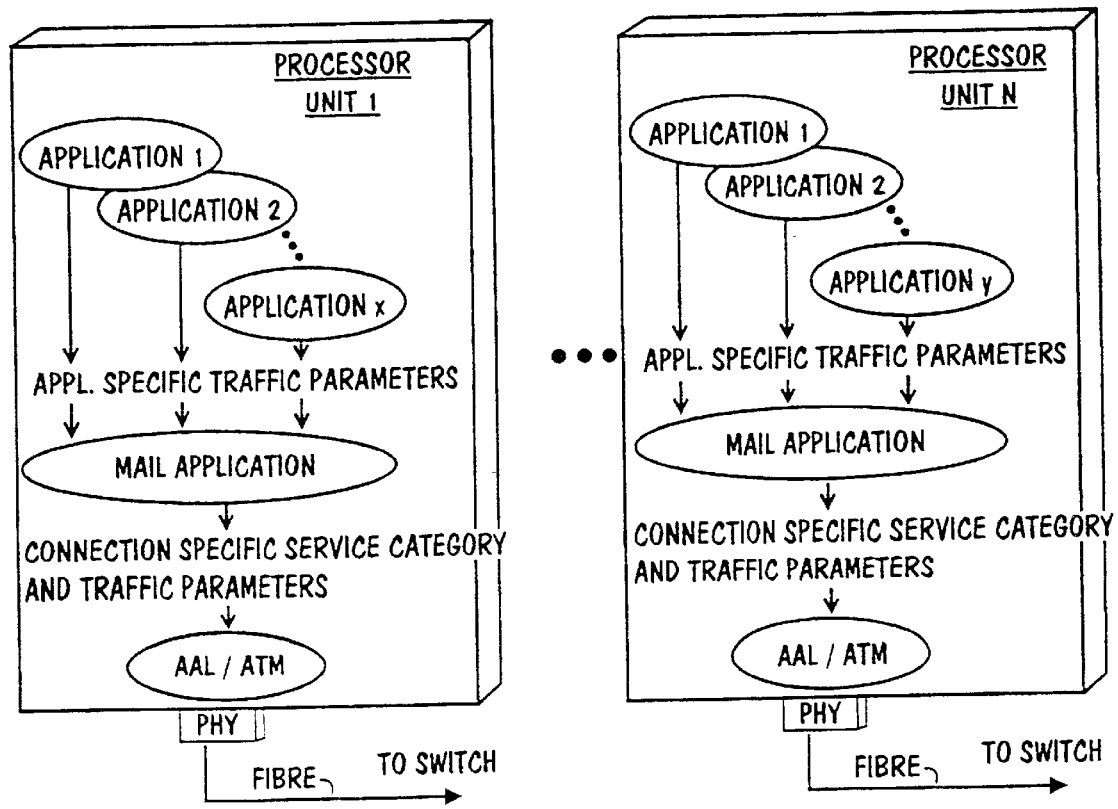
FIG. 5 illustrates the preferred embodiment of the invention.

FIG. 5 illustrates the preferred embodiment. Each of the processor units Unit 1, ..., Unit N has a plurality of applications that have generally been marked as Application n. The number n of the applications may, of course, vary in different processor units, one having x and the other y of them.

As regards traffic parameters, each application has its own needs. Thus, for example application Application 1 running in computer Processor Unit 1 requires a much higher peak cell rate PCR than Application 2 whose sustainable cell rate SCR may be higher than that of Application x. When an application requires services, as it wants to send information to an application running in another computer unit, it transmits a service request to telecommunication entity Mail Application. The request comprises the application's traffic parameters and the identifier. Instead of the traffic parameters, the request may comprise information on transmission needs whereby the telecommunication entity selects suitable parameters for them. The telecommunication entity receives the request and deducts which service category the application that made the service request is to use on the connection to be granted.

Figure 6A:
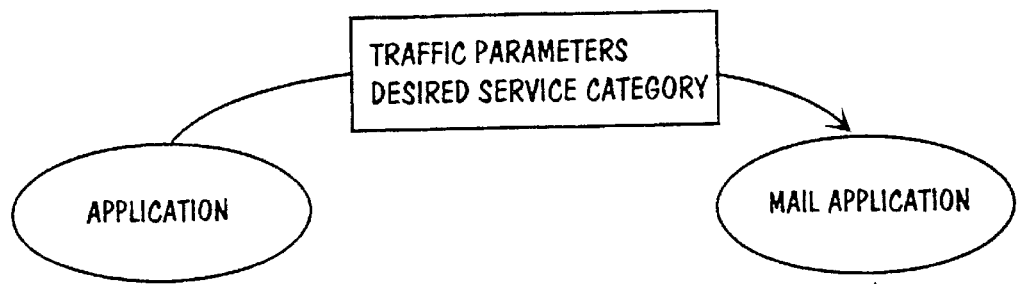
FIGS. 6A–6C illustrate the contents of service requests.
Figure 6B:
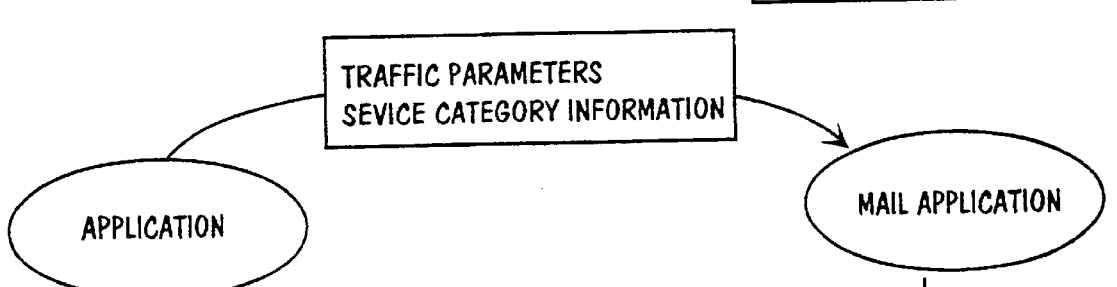
Figure 6C:
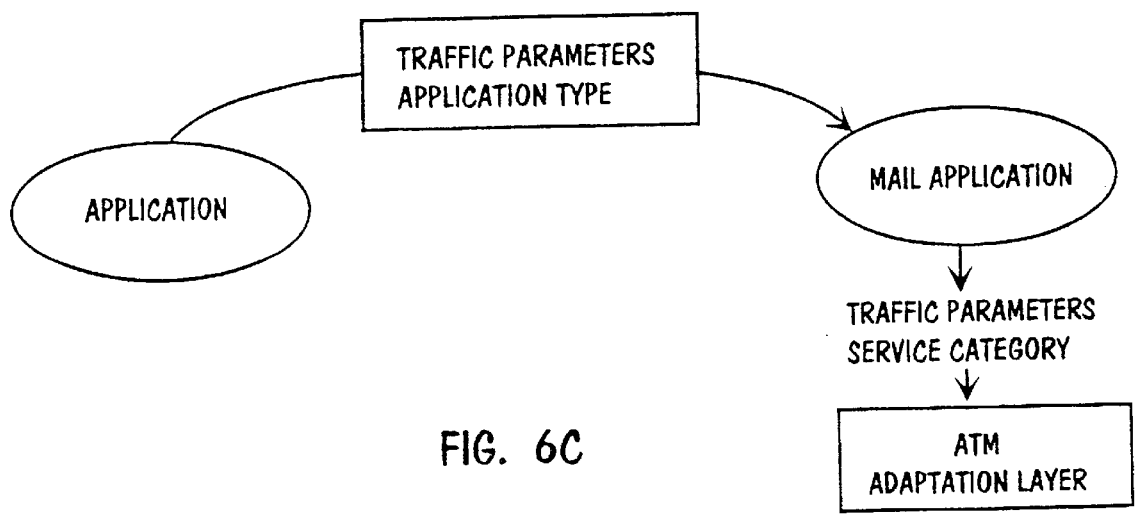

Different methods for selecting traffic parameters and service categories are illustrated in FIGS. 6A–6C.

The traffic parameters can be selected so that the application informs the telecommunication entity Mail Application of them in its service request. Alternatively, it can announce a set of specifications regarding its transmission needs, whereby the telecommunication entity determines the suitable parameters based on that. FIGS. 6A–6C show the first method in which the application states its traffic parameters.

As to service categories, there are three possible selection methods.

According to FIG. 7A, the application itself deducts which service category is best suited for it. In such a case, the request sent to the telecommunication entity includes, in addition to traffic parameters, information on the desired service category of the application. The telecommunication entity examines whether the service category can be granted or whether another one has to be granted, and then informs the AAL layer of the traffic parameters of the selected service category.

According to FIG. 7B, the application sends its service category information to the telecommunication entity. The telecommunication entity determines, based on this information, the service category and sends information on both that and on the traffic parameters to the AAL layer. The service category can be determined on the basis of e.g. a table which lists different types of service quality parameters. Information supplied by the application is compared to the information defined in the table, and the service category that suits best is selected.

According to FIG. 7C, the applications have been divided into a plurality of groups, and the same type is given to all the applications within the group. The telecommunication entity has at its disposal a table which lists the service category determined for each of the types. The service request sent by the application to the telecommunication entity includes, in addition to the traffic parameters, information on the application type. The telecommunication entity determines the service category corresponding to the type from the table, and sends information on it and on the traffic parameters to the AAL layer.

Second embodiment of the invention

The drawback of the preferred embodiment presented in FIG. 5 is that the deciding of the application's traffic parameters and the service category on a case-by-case basis adds to the complexity of the implementation. This can be avoided according to the second embodiment so that the application's traffic utilizes the same, fixed service category. In the first alternative, the same service category is assigned to all the applications, regardless of which computer they are in. Each application can give its assigned traffic parameters when it is requesting connection service, but the application cannot influence the service category. This is a simple implementation method, but it does not take into account the different requirements the applications might have concerning the quality of the traffic. In the second alternative, the applications are divided into groups, and all the applications within a group have the same, fixed service category. The traffic parameters and the service category are in this embodiment, too, determined by a program in the computer unit.

Figure 7:
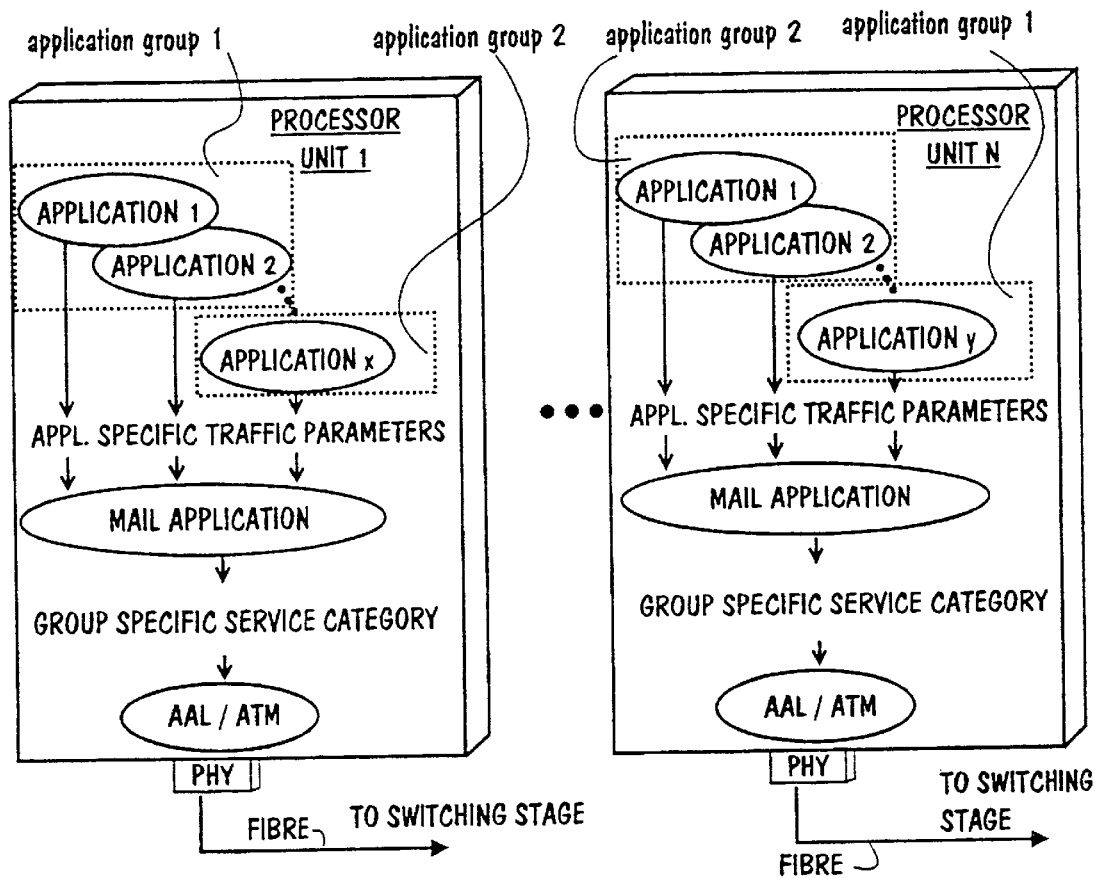
FIG. 7 illustrates the second embodiment of the invention.

The second embodiment is illustrated in FIG. 7. The figure corresponds to FIG. 5, so the markings and functions have for the most part been described in connection with that figure. Additionally, FIG. 7 shows the second alternative of the second embodiment in which the applications have been grouped. Application 1 and Application 2 running in computer Unit 1, and Application 12 and Application 22 running in computer Unit 2, form application group 1. Correspondingly, Application x in Unit 1 and Application y in Unit 2 form second application group 2. The service category of application group 1 can be e.g. ABR (Available Bit Rate), which means that the group includes applications that transmit data as bursts. No guarantees are given for delays. The service category of application group 2 can be e.g. VBR (Variable Bit Rate), which means that the applications in the group are variable-rate, real-time traffic sources and guarantees are given for transfer delays and their range of variation. There exists two cases of VBR, that is, real time Variable Bit Rate (rtVBR) and non real time Variable Bit Rate (nrtVRB), the first of which guarantees the ranges of variation. As regards traffic parameters, each application may have its own requirements.

When an application requires service, as it wants to send information to an application running in another computer unit, it transmits a service request to telecommunication entity Mail Application. The request comprises the application's traffic parameters and identifier. Instead of the traffic parameters, the request may comprise information on transmission needs whereby the telecommunication entity selects the suitable parameters.

The telecommunication entity receives the request and deducts, based on the application's identifier, which application category the requesting party belongs to. After that, it checks which service category has been granted for the group. In the deduction, a table may be used which comprises identifiers and corresponding service categories.

An alternative way as regards the request is that the application itself knows which service category it is to use and includes the information on the service category in the service request. In both cases, the telecommunication entity uses a group-specific service category in its service request to the AAL layer.

The invention does not in any way limit the number of computers that have applications; there may be any number of them. The data transfer protocol used is not restricted in any way. The invention may be implemented by hardware (HW), software (SW) or a combination thereof. The location of the control computer or any application, and the number of applications or connections are not limited in any way. Part of the computers and applications may be located in two or more separate ATM switches.

Figure 8:
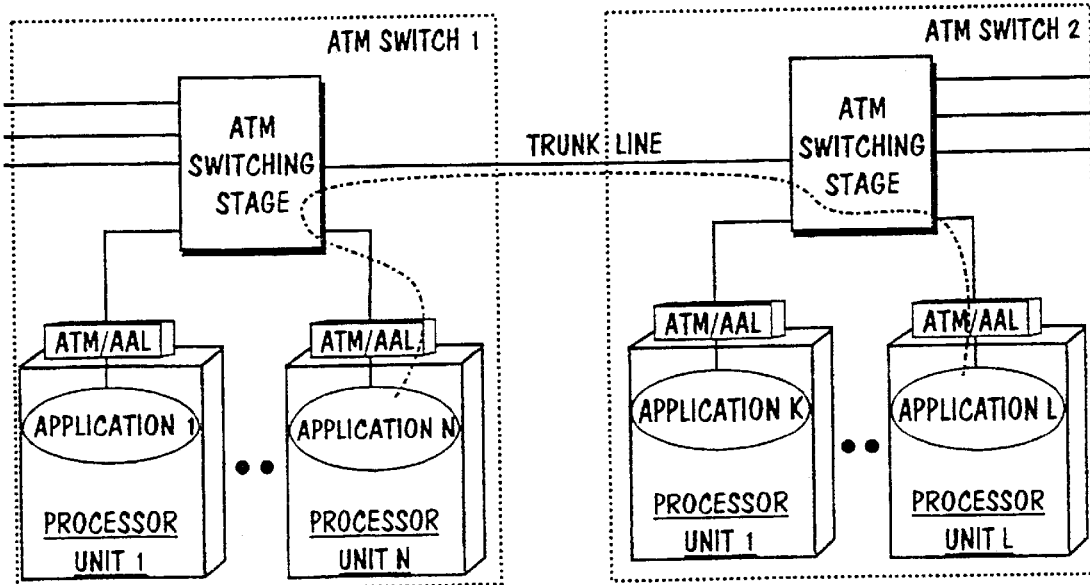
FIG. 8 illustrates data transmission of applications between two exchanges.

Such a case is illustrated in FIG. 8. It has N computers in switch 1 and L of them in switch 2. The application may communicate with each other and within the switch, whereby the cells only pass through the ATM switching stage, or the applications may communicate between the switches. The broken line in the example illustrates a data transmission connection between application N in processor unit N in switch 1 and application L in processor unit L in switch 2.

What is claimed is:

1. A system for transmitting cells of internal traffic between computer units in a broadband telecommunication system which comprises:
    an ATM switch which has at least one input port and a plurality of output ports and which switches an internal traffic cell applied to the input port to an output port,
    a connection control unit which, as a response to a request sent by the party requesting the connection, the request including the party's traffic and quality parameters as well as the desired service category, decides whether the connection can be accepted and in the affirmative case establishes a virtual connection to another party, at least one computer unit controlling the switch, in which at least one application is running, wherein the at least one application communicates with applications in other computer units, wherein each computer unit has an entity carrying out ATM adaptation layer functions, the entity inserts information which was generated by the application and is to be transmitted into the data section of the internal traffic cell and the entity correspondingly combines the data sections of the cells received from the other applications into received information, each computer unit comprises an entity handling communications, which, as a response to the application's request to be allowed to transmit information to an application in another computer unit, transmits the application's traffic and quality parameters as well as the desired service category to the connection control unit, whereby the application is able to act as the party requesting a connection from the ATM switch, the service category requested by all the applications are at least selected connection-specifically.

2. A system as claimed in claim 1, wherein the traffic parameters used by the application are at least selected connection-specifically, and that the traffic parameters are changed in accordance with changes caused by the actual subscriber traffic in the use of the system capacity, whereby internal traffic and subscriber traffic are integrated as effectively as possible.

3. A system as claimed in claim 1, wherein the application informs a telecommunication entity of the traffic parameters it desires, and as a response to this information, the telecommunication entity decides which traffic parameters are to be granted for the connection.

4. A system as claimed in claim 1, wherein the application informs the telecommunication entity of the desired service category, and as a response to this information the telecommunication entity decides which service category is to be used on the connection.

5. A system as claimed in claim 1, wherein the application gives information to the telecommunication entity on the desired quality of service, and as a response to this information the telecommunication entity decides which service category is to be used on the connection.

6. A system as claimed in claim 1, wherein a fixed service category has been selected for the. application, whereby the same application always uses the predetermined service category.

7. A system as claimed in claim 1, wherein the same, fixed service category has been selected for all the applications.

8. A system as claimed in claim 1, wherein the applications have been divided into groups, and the same, fixed service category has been selected for the applications within the same group, whereby the applications belonging to the same group always use the same, predetermined service category.

9. A system as claimed in claim 1, wherein the applications have been divided into groups, and the applications within the same group have at their disposal part of the service categories, whereby the applications belonging to the same group have at least two service categories to select from.

10. A system as claimed in any one if claim 6, wherein the application itself knows the service category set for it and informs the telecommunications entity of it.

11. A system as claimed in any one of claim 6, wherein the application informs the telecommunications entity of the identifier information of the application, and in that the telecommunication entity, as a response to the identifier information, decides which service category the application is to use.

12. A system as claimed in claim 1, wherein the virtual connections are set up permanently between all the applications, whereby the connection is not released after a service request from a single application.

13. A system as claimed in claim 1, wherein applications communicating with each other are located at different switches, whereby the internal traffic cells pass among the subscriber traffic cells across links that interconnect the switches.

* * * * *